United States Patent [19]

Kokaji et al.

[11] 4,317,630
[45] Mar. 2, 1982

[54] COPYING MACHINE

[75] Inventors: Norio Kokaji, Hino; Nobuyuki Shimada, Kokubunji, both of Japan

[73] Assignee: Iwatsu Electric Co., Ltd., Tokyo, Japan

[21] Appl. No.: 199,622

[22] Filed: Oct. 22, 1980

[30] Foreign Application Priority Data

Oct. 26, 1979 [JP] Japan .................... 54-138301

[51] Int. Cl.³ .................................. G03G 15/28
[52] U.S. Cl. ................................ 355/50; 355/8; 355/14 R
[58] Field of Search ............... 355/8, 14 R, 50, 51

[56] References Cited

U.S. PATENT DOCUMENTS 4,140,386  2/1979  Satomi ........................... 355/8
4,270,857  6/1981  Komori et al. .................. 355/8

Primary Examiner—L. T. Hix
Assistant Examiner—Alan Mathews
Attorney, Agent, or Firm—Blakely, Sokoloff, Taylor & Zafman

[57] ABSTRACT

A copying machine comprises an imaging mechanism and a recording mechanism. An imaging sub-scan carriage of the imaging mechanism is scanned in the sub-scanning direction between an imaging start position and an intermediate position to image a master. The recording mechanism includes a recording medium such as a recording drum and a recording sub-scan carriage. The recording medium rotates in the main scanning direction while the recording sub-scan carriage scans in the sub-scanning direction perpendicular to the main scanning direction. When the imaging sub-scan carriage is scanning for one line, the recording sub-scan carriage is also scanning for one line, during which the recording medium performs one main scan so that a latent image of one line of the master can be formed on the recording medium. In response to the first sub-scan of the imaging sub-scan carriage between start and intermediate positions, the recording sub-scan carriage conducts the sub-scan between start and intermediate positions in relation to the recording medium. In response to the subsequent sub-scan of the imaging sub-scan carriage between start and intermediate positions, the recording sub-scan carriage conducts the sub-scan between intermediate and termination positions, so that a TWIN-COPY latent image of the master which is imaged by the imaging sub-scan carriage can be formed on the recording medium.

3 Claims, 8 Drawing Figures

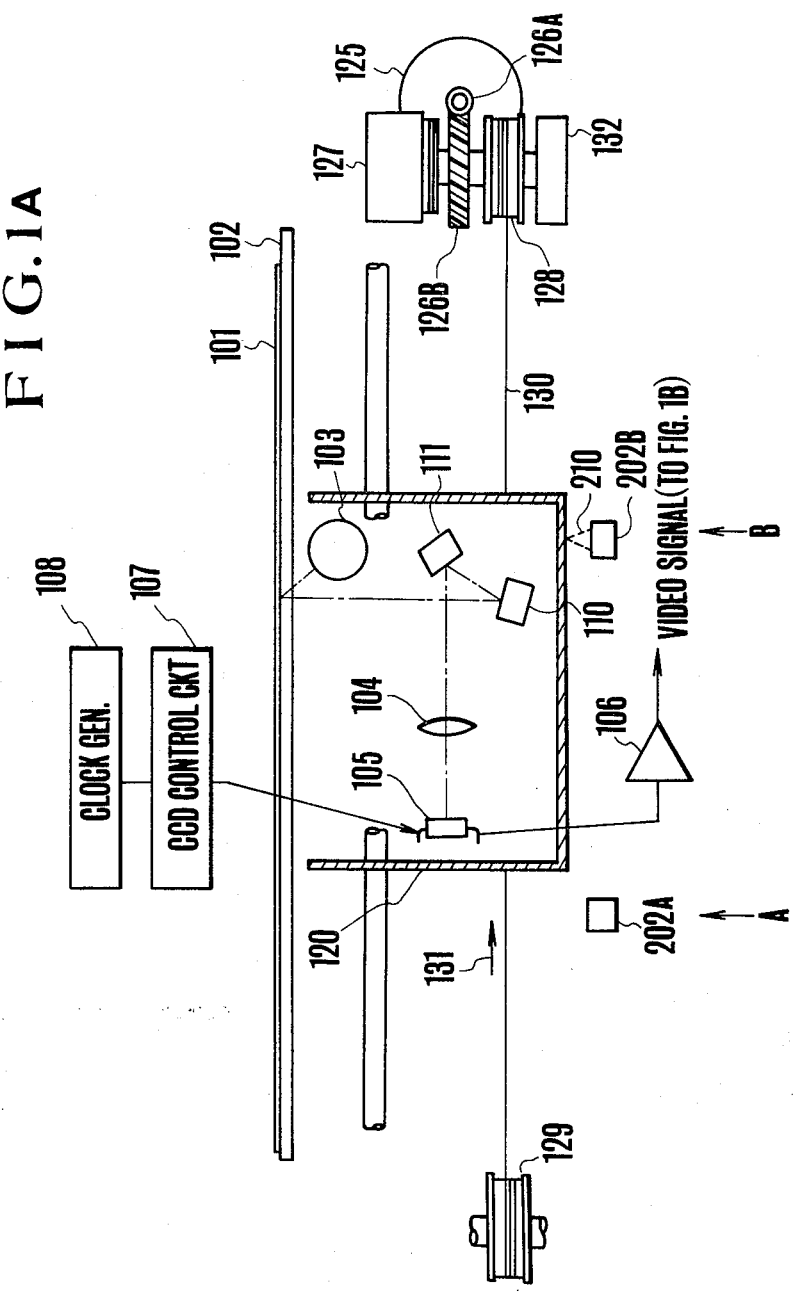

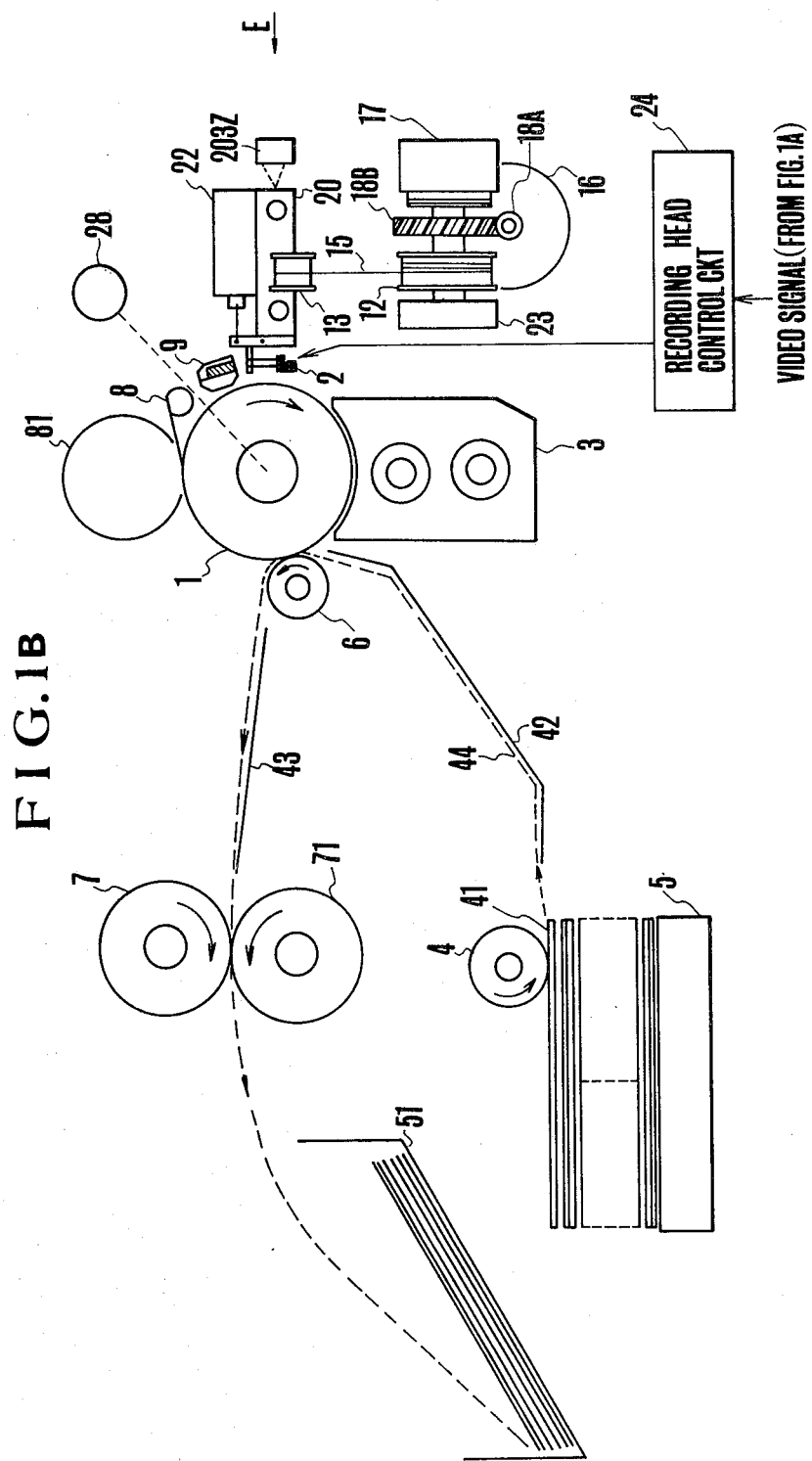

FIG.2
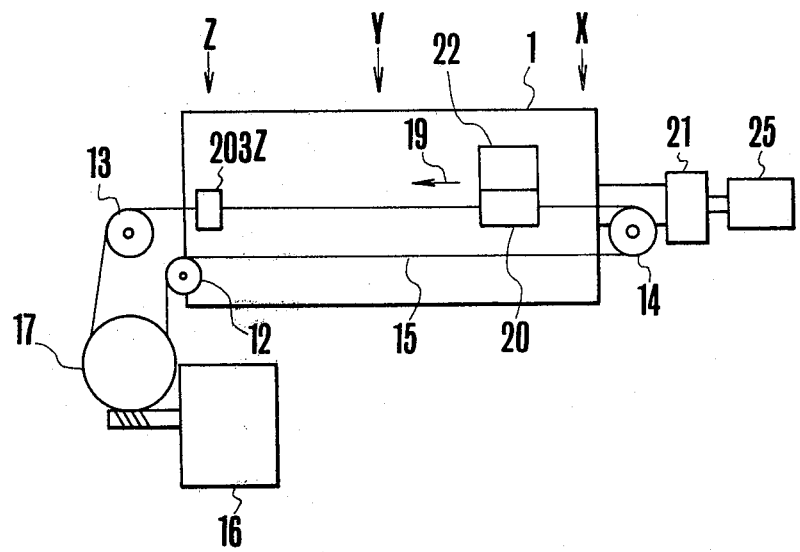
FIG.3
FIG.6
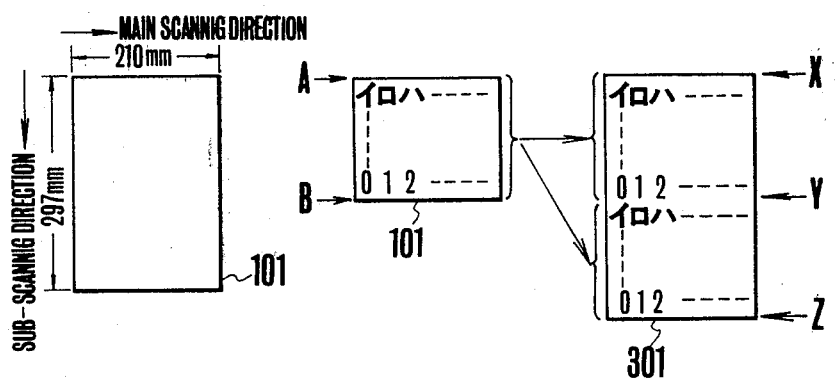

COPYING MACHINE

BACKGROUND OF THE INVENTION

This invention relates to a copying machine which can reproduce a plural number of copies on a single sheet of paper automatically.

In the prior art, when a plural number of reproduced copies have to be made from a small-sized master (first master) by using a copying machine (for instance from A5 size or from B5 size), in order to save the number of sheets of copy paper, such procedures are usually taken at office that one copy is first reproduced, then the reproduced copy (second master) is placed side by side of the first master on a master table of the copying machine and those two masters are copied simultaneously onto a sheet of paper having a size twice as large as the first master (for instance of A4 size), which will be cut into two later. In this way the consumption of paper will be cut down to a half and the number of counts of copy counter will also be saved by one half.

This procedure, however, is detrimental in that it requires manual labour for reproducing the second master and placing it side by side of the first master on the table. Further, when reproducing the second master, one half of the sheet is wasted. Thus, high conveniency can be assured if this manual operation is replaced with automatic operation by machines. Moreover, high economy and thrift can be attained if the whole area of a paper is fully utilized from the first step of copying.

SUMMARY OF THE INVENTION

This invention is conceived from the aforementioned point of view, and aims at reproducing automatically more than two identical copies out of one master on a single sheet of paper without requiring manual labour but by simply pushing a button. More than two identical copies out of one master on a single sheet of copy paper will be referred to as TWIN-COPY hereinafter.

According to the present invention, the above object can be accomplished by a copying machine comprising imaging scan means for scanning and imaging a master to produce a master image, latent image forming means for forming, on a recording medium, a latent image of the master, position sensor means for sensing the position of the imaging scan means, and controller means which receives a detection signal generated from the position sensor means during scan of the master to temporalily stop the operation of the latent image forming means when the imaging scan means reaches an intermediate position and simultaneously return the imaging scan means to an imaging start position and which restarts the imaging operation from the start position and the latent image forming operation from the position where the latent image forming means has temporarily stopped to an ultimate stop position, whereby more than two identical copies can be reproduced from the same master on a single sheet of copy paper.

BRIEF DESCRIPTION OF THE DRAWINGS

FIG. 1A is a schematic diagram of an imaging mechanism embodying the invention;

FIG. 1B is a schematic diagram of a recording mechanism embodying the invention;

FIG. 2 is a schematic diagram of the recording mechanism shown in FIG. 1B viewed from arrow E;

FIG. 3 shows an example of master;

FIG. 6 is a diagrammatic representation showing the relationship between a master and a TWIN-COPY.

DESCRIPTION OF THE PREFERRED EMBODIMENTS

Figure 4:
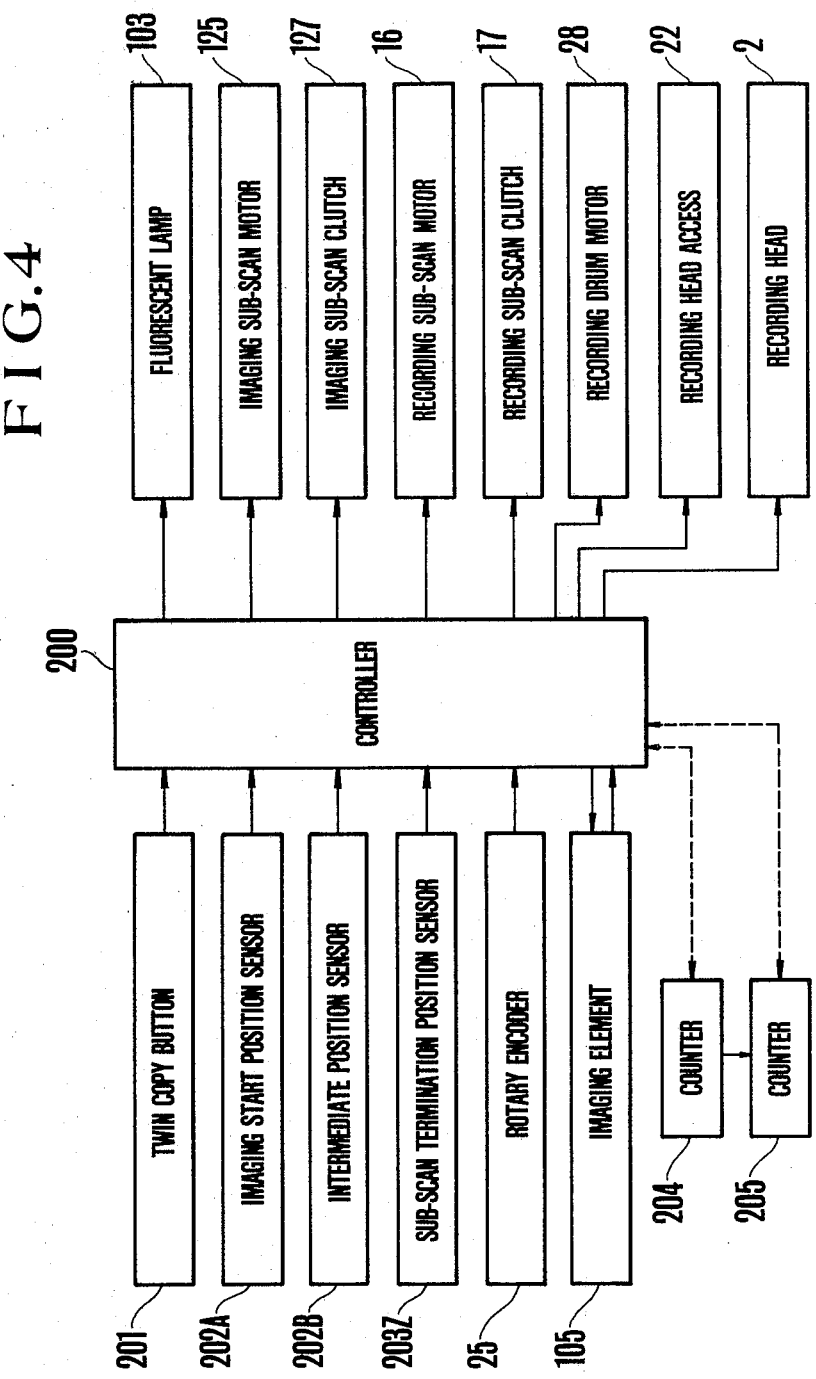
FIG. 4 shows a controller embodying the invention.

Referring to FIGS. 1A and 1B, there are shown an imaging section and a recording section of a copying machine embodying the invention. Explanation will be made assuming that the imaging section has a photoelectric conversion element for one line and the recording section has one recording head. In FIG. 1A, a master 101 placed on a master table (for instance of transparent glass plate) is illuminated by light from a light source 103 such as for instance a fluorescent lamp and the light reflected from the master reaches a photoelectric conversion element 105 such as for instance a CCD, a charge coupled device, via reflection mirrors 110, 111 and a lens 104 to be converted to an electrical video signal corresponding to the master 101.

The video signal is supplied to a recording head 2 such as for example a magnetic head in FIG. 1B to form a magnetic latent image on a recording drum 1 such as a magnetic drum. The main scanning direction for the latent image formation is perpendicular to the sheet of the drawing as viewed from FIG. 1A and corresponds to the direction of rotation of the recording drum in FIG. 1B. One main scanning is completed for one rotation of the recording drum. When imaging operation/latent image formation for one line is completed or when the imaging operation/latent image formation for one line is proceeding, the imaging section and the recording section conduct sub-scanning for one line. The sub-scanning is conducted in FIG. 1A by the movement of an imaging sub-scan carriage 120 in the direction indicated by arrow 131. In FIG. 1B, however, it is conducted by the movement of a recording sub-scan carriage 20 carrying the recording head 2 thereon in the direction perpendicular to sheet of the drawing.

FIG. 2 shows the sub-scanning of the recording section more clearly wherein the recording sub-scan carriage 20 is moved in the direction indicated by arrow 19 by a recording sub-scan driving source 16 (for instance a pulse motor), pullies 12, 13 and 14 and a wire 15. Directions of the main scanning and the sub-scanning are shown in FIG. 3 by way of a master the size of which is A4.

As shown in FIG. 1A, the imaging sub-scan carriage 120 comprising light source 103, reflection mirrors 110 and 111, lens 104 and photoelectric conversion element 105 is moved by an imaging sub-scan driving source 125 (for instance a pulse motor), pullies 128 and 129 and a wire 130.

By the time the scanning over the whole area of the master 101 is completed by repeating the main scanning of the recording section and the sub-scanning of the imaging and recording sections, a magnetic latent image corresponding to the master 101 has been formed on the recording drum 1. The magnetic latent image on the recording drum 1 is then developed with toner by a developing device shown in FIG. 1B. Meanwhile a sheet of recording paper 41 which is carried on a paper feeding table 5 is fed by a paper feeding roller 4 so as to move on a conveyor guide 42 as shown in broken line 44 to reach a transfer roller 6. The toner on the recording drum 1 is transferred to the recording paper 41 by the transfer roller 6 and the recording paper 41 is carried on a conveyor guide 43 to fixing devices 7, 71 which fix the toner on the recording paper 41. The recording paper 41 is then discharged to a paper receiver 51. Surplus toner is eliminated by a blade 8 and a sucker 81. When the next latent image is to be formed, the previous latent image is erased by an erasing head 9.

In FIG. 1A, a clock pulse train generated from a clock generator 108 is supplied to the CCD 105 via a CCD control circuit 107 and the output signal of CCD 105 is taken out as a video signal via a video amplifier 106 to drive the recording head 2 included in the recording sub-scan carriage 20 through a recording head control circuit 24 shown in FIG. 1B. The clock generator 108 includes a rotary encoder 25 which is directly connected to the shaft of the recording drum 1 via a suitable coupling 21 as shown in FIG. 2. The rotary encoder 25 generates one index pulse for one rotation of the recording drum 1 and numerous clock pulses at an interval of the generation of the index pulse. These index pulse and the clock pulse accurately indicate a position on the circumference of the recording drum 1.

Figure 5:
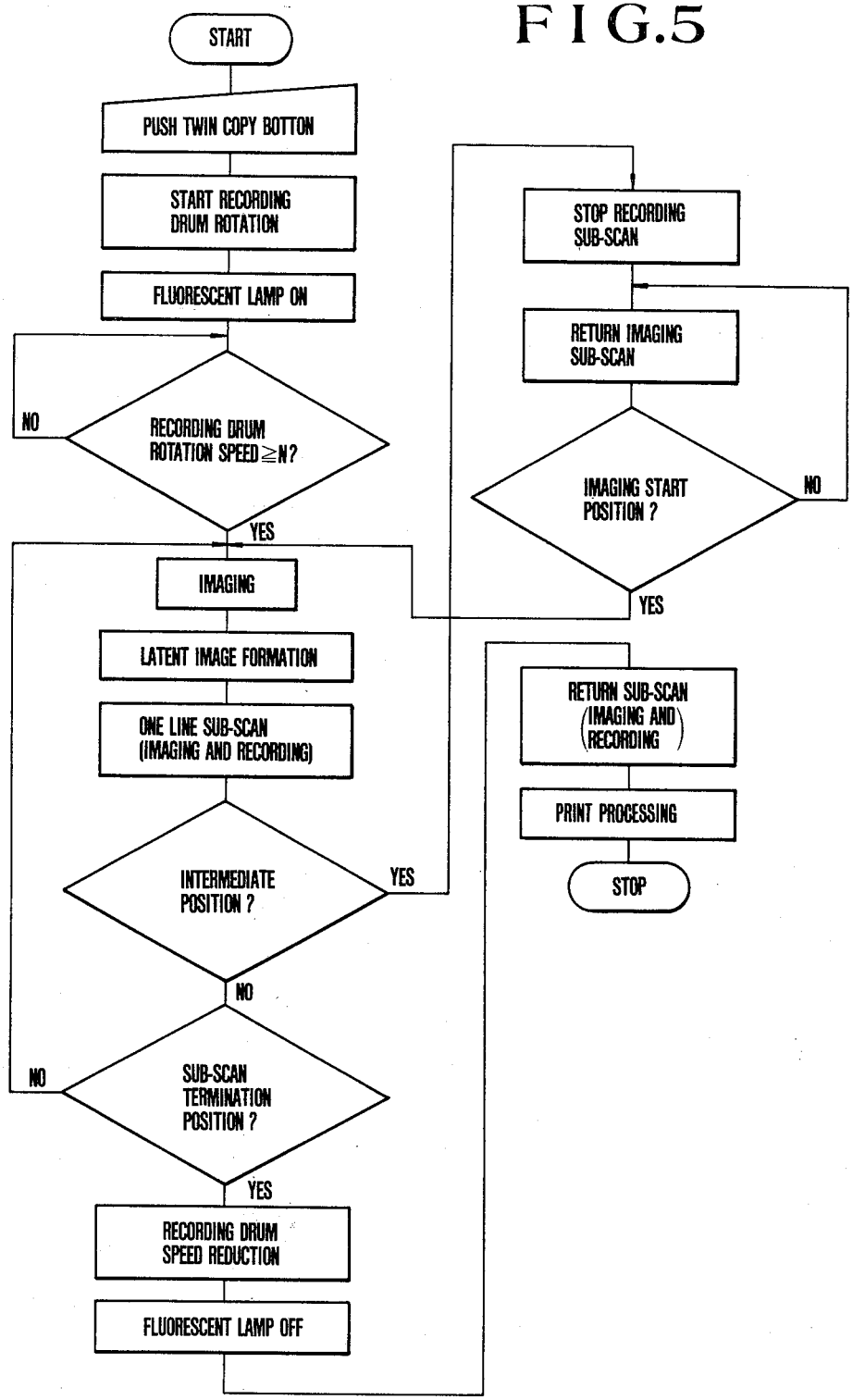
FIG. 5 is a flow chart of a control scheme according to this invention.

FIG. 4 shows a controller 200. The controller 200 may comprise, for example, a microprocessor. Accordingly, when a TWIN-COPY button to be described later is pressed, the controller starts to apply control signals to the peripheral units in accordance with a sequence subject to predetermined programs. FIG. 5 is a flow chart of the control. The invention will now be explained with reference to FIGS. 1A to 5. A TWIN-COPY button 210 (FIG. 4) is provided on an operation panel (not shown) of the copying machine. When this TWIN-COPY button is pushed down, the controller 200 passes electric current to a recording drum motor 28 to rotate the recording drum 1 and at the same time to turn on the fluorescent lamp 103. When the rotation speed of the recording drum reaches to a predetermined value of N rpm (for instance N=3800), the controller causes a recording head access mechanism 22 to operate so that the imaging operation is carried out and a latent image is formed on the recording drum 1 by supplying a video signal from the photoelectric conversion element 105 to the recording head 2 via the recording head control circuit 24. During the process of forming latent images for one line, the sub-scanning is conducted for one line. When current is passed to the imaging sub-scan motor 125 (for instance a pulse motor) and to an imaging sub-scan clutch 127, the rotation of the motor 125 is transmitted to the pully 128 via gears 126A and 126B to pull the wire 180, thereby moving the sub-scan carriage 120 in the sub-scanning direction (indicated by arrow 131). The current is simultaneously passed to the recording sub-scan motor 16 (for instance a pulse motor) and to a recording sub-scan clutch 17 to transmit the rotation of the motor 16 to the pully 12 via gears 18A and 18B and to pull the wire 15, thereby moving the recording sub-scan carriage in the sub-scanning direction (indicated by arrow 19). After repeating sub-scanning for the imaging and the latent image forming operations, it is detected that the imaging sub-scan carriage 120 has come to the intermediate position. An intermediate position sensor 202B may comprise, for instance, a set of a light emitting diode and a phototransister. The light emitted from the light emitting diode is reflected at the sub-scan carriage 120 as shown by broken line 210 and received by the phototransister. Thus, the controller is informed of the sub-scan carriage 120 staying at the intermediate position. The controller 200 stops temporarily the recording sub-scan motor 16 and simultaneously makes the imaging sub-scan carriage return to the start or initial point. More particularly, when the clutch 127 is deenergized, the pully 128 is disconnected from the motor 127 and the imaging sub-scan carriage 120 is returned in the direction opposite to arrow 131 by the restoring force of a coiled spring 132. When an imaging start position sensor 202A detects that the imaging sub-scan carriage 120 has returned to the initial point, imaging is resumed again. The recording sub-scan carriage resumes the sub-scanning from the intermediate position (Y location) where it stopped previously. The sub-scanning for imaging operation and latent image formation is repeated from the initial or start point to the intermediate position and when it is detected by a sub-scan termination position sensor 203 that the recording sub-scan carriage 20 has come to the sub-scan termination position (Z location) to stop ultimately, the latent image formation ends.

Then, the controller applies braking on the recording drum motor 28 to decrease the speed of the recording drum 1, turns off the fluorescent lamp 103, releases the recording head access 22, releases sub-scan clutches 127 and 17 and allows the sub-scan returning with the restoring force of coiled springs 23 and 132. Then printing processes such as development, transferring, paper feeding, fixing and cleaning are conducted.

FIG. 6 shows a thus obtained reproduced copy 301 and a master 101 for comparison. Location A on the master 101 corresponds to location X on the reproduced copy 301 while location B of the master 101 corresponds to location Y on the copy 301. The imaging sub-scan carriage 120 returns from B to A while the recording sub-scan carriage 20 stays at the location Y. During the time the imaging proceeds from the location A to the location B, the recording sub-scan carriage 20 scans to the location Z. In the aforementioned operational procedure, a TWIN-COPY is obtained.

Figure 7:
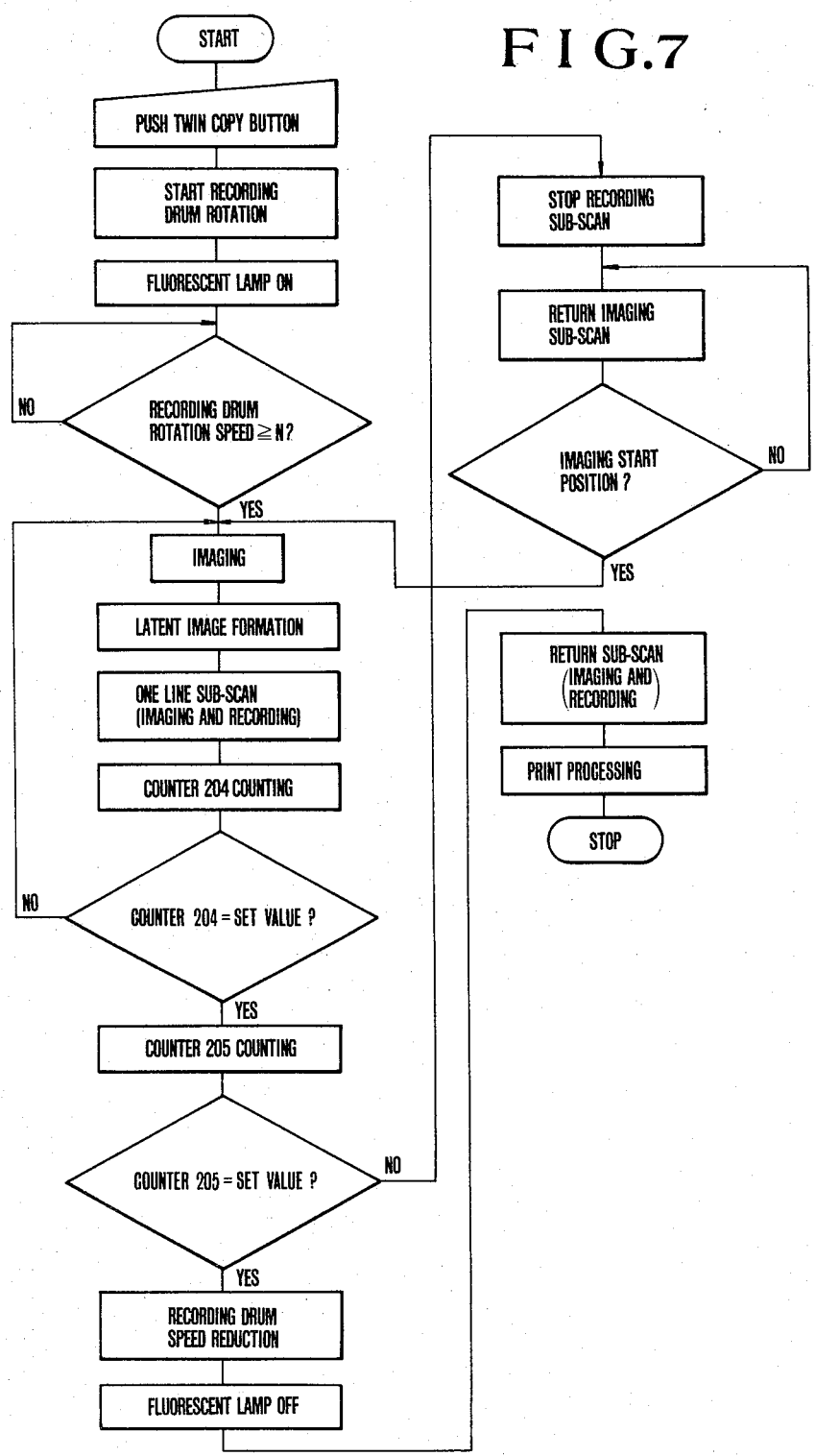
FIG. 7 is a flow chart of another control scheme according to the invention.

A second embodiment of the invention will now be explained by referring to FIG. 7.

When the TWIN-COPY button 201 on the operation panel is pushed, the controller 200 passes current to the recording drum motor 28 to rotate the recording drum 1 and simultaneously turns on the fluorescent lamp 103 as in the foregoing embodiment. When the revolution speed of the recording drum 1 reaches a predetermined value N rpm, (for instance N=3800), the controller starts the recording head access mechanism 22, conducts imaging operation, supplies a video signal from the imaging element 105 to the recording head 2 via the recording head control circuit 24 so as to form a latent image on the recording drum 1. The sub-scanning is conducted for one line while one line of latent image is being formed. Electric current is passed to the imaging sub-scan motor 125 (for instance a pulse motor) and then to the imaging sub-scan clutch 127. When the imaging sub-scan clutch 127 is energized, the rotation of the motor 125 is transmitted to the pully 128 via gears 126A and 126B to pull the wire 130, thereby moving the sub-scan carriage 120 in the sub-scanning direction indicated by arrow 131. Electric current is at the same time passed to the recording sub-scan motor 16 (for instance a pulse motor) and when the recording sub-scan clutch 17 is supplied with current, the rotation of the motor 16 is transmitted to the pully 18 via gears 18A and 18B to pull the wire 15, thereby moving the sub-scan carriage 20 in the sub-scanning direction indicated by arrow 19. The above operation is carried out in the same manner as the foregoing embodiment.

In this second embodiment, instead of the intermediate position sensor 202B, counters 204 and 205 are provided. When the sub-scanning is conducted for one line, the counter 104 counts by one. For instance, in a case when a width of 148 mm of a A5 size is scanned with a sub-scanning density of 10 lines/mm, 1480 sub-scanning lines reach the intermediate position (the location B or Y).

Therefore, if a predetermined value of 1480 is set at the counter 204 in advance, determination of the intermediate position can be effected. After repeatedly conducting the sub-scanning for imaging and latent image forming as well as counting operation of the counter 204, the controller 200 is informed of the fact that the sub-scan carriage 120 has arrived at the intermediate position. Then the counter 205 counts by one, the recording sub-scan carriage 20 stops at the location Y as described in FIG. 5, and the imaging sub-scan carriage 120 returns to the initial position (location A). When the carriage 120 returns to the initial position, the cycle of sub-scanning for imaging and latent image forming and counting operation is again repeated and when the value on the counter 204 has reached a set value, the counter 205 shifts to 2. Accordingly, if the predetermined value set on the counter 205 is 2, latent image forming operation ends here. As explained in FIG. 5, the rotation of the recording drum 1 decreases, the fluorescent lamp is turned off, sub-scan returning is conducted and print is processed.

Typical examples have been described above but various modifications are possible. For instance, if the intermediate position is arranged in a suitable manner, more than two of reproduced copies can be made on a single sheet of paper. Four copies of A5 size may be reproduced on a sheet of copy paper of A8 size (for convenience the reproduced copy is called TWIN-COPY still in this case). This may be achieved by suitably setting the predetermined values on the counters 204 and 205. The sub-scanning returning may be conducted by reversely rotating the sub-scan motor 125. The imaging start position may be detected by substracting the counter 204. Further, the sub-scan termination position may be detected by using a counter. The controller 200 may comprise a TTL logic circuit, a microprocesser, etc. In the aforementioned embodiments, the case of magnetic reproducing device has been referred to; however, the present invention is of course applicable to electrostatic copiers. As described above, the invention is extremely practical as well as economical in that more than two copies can be reproduced from the same master on a single sheet of recording paper.

What is claimed is:

1. A copying machine comprising imaging scan means for scanning and imaging a master to produce a master image, latent image forming means for forming, on a recording medium, a latent image of the master, position sensor means for sensing the position of the imaging scan means, and controller means which receives a detection signal generated from the position sensor means during scan of the master to temporarily stop the operation of the latent image forming means when the imaging scan means reaches an intermediate position and simultaneously return the imaging scan means to an imaging start position and which restarts the imaging operation from the start position and the latent image forming operation from the position where the latent image forming means has temporarily stopped to an ultimate stop position, whereby more than two identical copies can be reproduced from the same master on a single sheet of copy paper.

2. A copying machine according to claim 1 wherein the position sensor means comprises an imaging start position sensor and an intermediate position sensor associated with the imaging scan means, said intermediate position sensor producing a control signal for temporarily stopping the latent image forming means and for returning the imaging scan means.

3. A copying machine according to claim 1 which comprises a sub-scan termination position sensor associated with the latent image forming means for detection of the ultimate stop position.

* * * * *